(12) United States Patent
Blair

(10) Patent No.: US 7,991,613 B2
(45) Date of Patent: Aug. 2, 2011

(54) ANALYZING AUDIO COMPONENTS AND GENERATING TEXT WITH INTEGRATED ADDITIONAL SESSION INFORMATION

(75) Inventor: Christopher D. Blair, South Chailey (GB)

(73) Assignee: Verint Americas Inc., Roswell, GA (US)

( * ) Notice: Subject to any disclaimer, the term of this patent is extended or adjusted under 35 U.S.C. 154(b) by 1309 days.

(21) Appl. No.: 11/540,904

(22) Filed: Sep. 29, 2006

(65) Prior Publication Data

US 2008/0082330 A1    Apr. 3, 2008

(51) Int. Cl.
  *G10L 15/26* (2006.01)
  *H04M 1/656* (2006.01)
(52) U.S. Cl. ...... 704/235; 704/225; 707/711; 379/88.01
(58) Field of Classification Search .................. 704/231, 704/235, 255, 270.1, 225, 273; 707/3, 104.1, 707/711, 741; 379/265.06, 266.1, 88.01
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,689,817 A * | 8/1987 | Kroon ............. 704/260 |
| 4,694,483 A | 9/1987 | Cheung |
| 4,763,353 A | 8/1988 | Canale et al. |
| 4,783,810 A * | 11/1988 | Kroon ............. 704/260 |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |

(Continued)

FOREIGN PATENT DOCUMENTS

EP    0453128 A2    10/1991

(Continued)

OTHER PUBLICATIONS

Abstract, net.working: "An Online Webliography," *Technical Training* pp. 4-5 (Nov.-Dec. 1998).

(Continued)

*Primary Examiner* — Martin Lerner
(74) *Attorney, Agent, or Firm* — McKeon Muenier Carlin Curfman

(57) ABSTRACT

Systems and methods for analyzing audio components of communications are provided. In this regard, a representative system incorporates an audio analyzer operative to: receive information corresponding to an audio component of a communication session; generate text from the information; and integrate the text with additional information corresponding to the communication session, the additional information being integrated in a textual format.

20 Claims, 4 Drawing Sheets

U.S. PATENT DOCUMENTS

| | | | |
|---|---|---|---|
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,243,713 B1 * | 6/2001 | Nelson et al. ............... 707/104.1 |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,229 B1 * | 4/2003 | Love et al. ............... 434/308 |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,850,609 B1 * | 2/2005 | Schrage ............... 379/202.01 |
| 6,870,916 B2 | 3/2005 | Henrikson et al. |
| 6,876,728 B2 * | 4/2005 | Kredo et al. ............... 379/88.17 |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,973,428 B2 * | 12/2005 | Boguraev et al. ............... 704/251 |
| 6,990,448 B2 * | 1/2006 | Charlesworth et al. ....... 704/243 |
| 7,076,427 B2 * | 7/2006 | Scarano et al. ............... 704/270 |
| RE40,634 E * | 2/2009 | Blair et al. ............... 379/67.1 |
| 7,852,994 B1 * | 12/2010 | Blair et al. ............... 379/88.17 |
| 7,873,156 B1 * | 1/2011 | Blair ............... 379/265.06 |
| 7,881,216 B2 * | 2/2011 | Blair ............... 370/252 |
| 7,885,813 B2 * | 2/2011 | Blair ............... 704/246 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154072 A1 * | 8/2003 | Young et al. ............... 704/9 |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0071165 A1 * | 3/2005 | Hofstader et al. ............ 704/270.1 |
| 2005/0138560 A1 | 6/2005 | Lee et al. |
| 2006/0111904 A1 * | 5/2006 | Wasserblat et al. ............ 704/246 |
| 2008/0080385 A1 | 4/2008 | Blair ............... 370/252 |
| 2008/0082340 A1 * | 4/2008 | Blair et al. ............... 704/275 |
| 2008/0181417 A1 * | 7/2008 | Pereg et al. ............... 381/17 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Rourke, "Basic Skills Get a Boost," Technical Training pp. 10-13 (Jul./Aug. 1998).
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Piskurich, Now-You-See-'Em, Now-You-Don't Learning Centers, *Technical Training* pp. 18-21 (Jan./Feb. 1999).
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You on (Yet)*, The AnchorDesk, Jul. 7, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, 093/28/96.

Kenny. *TV Meets Internet*, PC World Online, Mar. 28, 1996.

Linderholm. *Avatar Debuts Home Theater PC*, PC World Online, Dec. 1, 1999.

Rohde. *Gates Touts Interactive TV*, InfoWorld, Oct. 14, 1999.

Ross. *Broadcasters Use TV Signals to Send Data*, PC World Oct. 1996.

Stewart. *Interactive Television at Home: Television Meets the Internet*, Aug. 1998.

Wilson. *U.S. West Revisits Interactive TV*, Interactive Week, Nov. 28, 1999.

\* cited by examiner aaaa cccCCC    aaaaaaaaaaaa abababaaaa CCCBBBBCBBBaBBBaBCCCCC

ANALYZING AUDIO COMPONENTS AND GENERATING TEXT WITH INTEGRATED ADDITIONAL SESSION INFORMATION

BACKGROUND

It is desirable in many situations to record communications, such as telephone calls. This is particularly so in a contact center in which many agents may be handling hundreds of telephone calls each every day. Recording of these telephone calls can allow for quality assessment of agents, improvement of agent skills and/or dispute resolution, for example.

In this regard, it is becoming more commonplace for recordings of telephone communications to be reduced to transcript form. However, the number of individual words within each telephone call is such that storing each word as a record in a relational database is impractical for large contact centers handling millions of calls per annum.

SUMMARY

In this regard, systems and methods for analyzing audio components of communications are provided. An embodiment of such a system comprises an audio analyzer operative to: receive information corresponding to an audio component of a communication session; generate text from the information; and integrate the text with additional information corresponding to the communication session, the additional information being integrated in a textual format.

An embodiment of a method comprises: receiving information corresponding to an audio component of a communication session; generating text from the information; and integrating the text with additional information corresponding to the communication session, the additional information being integrated in a textual format.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 4 is a diagram depicting an embodiment of a textual representation of an audio component of a communication.

FIG. 5 is a diagram depicting another embodiment of a textual representation of an audio component of a communication.

FIG. 6 is a diagram depicting an embodiment of a call flow representation of a communication.

DETAILED DESCRIPTION

Systems and methods for analyzing audio components of communications are provided. In this regard, several exemplary embodiments will be described in which various aspects of audio components of communications are analyzed. By way of example, in some embodiments, the audio component of a communication, e.g., a telephone call, is converted to a textual format such as a transcript. Additional information, such as amplitude assessments of the communication, is associated with the textual format. Notably, such additional information also can be textual, thereby resulting in a data file that uses less memory than if the audio component were stored as audio and appended with the additional information. Moreover, since the data file uses a textual format, text-based indexing and searching can be readily accommodated.

The textual representation of the dialog and surrounding telephony experience occupies much less space per hour of telephone call than the audio recording of the call itself and hence can be accommodated within a recording system for marginal additional storage cost. The infrastructure of the recording system makes it easy to manage, access, secure and archive the content along with the audio to which it relates.

In some embodiments, this approach allows a single repository and search mechanism to search across both contacts that originated as text (e.g., email and web chat) and those originating as speech (e.g., telephone calls). This potentially enables a user to view their entire customer contact through a single mechanism.

Figure 1:
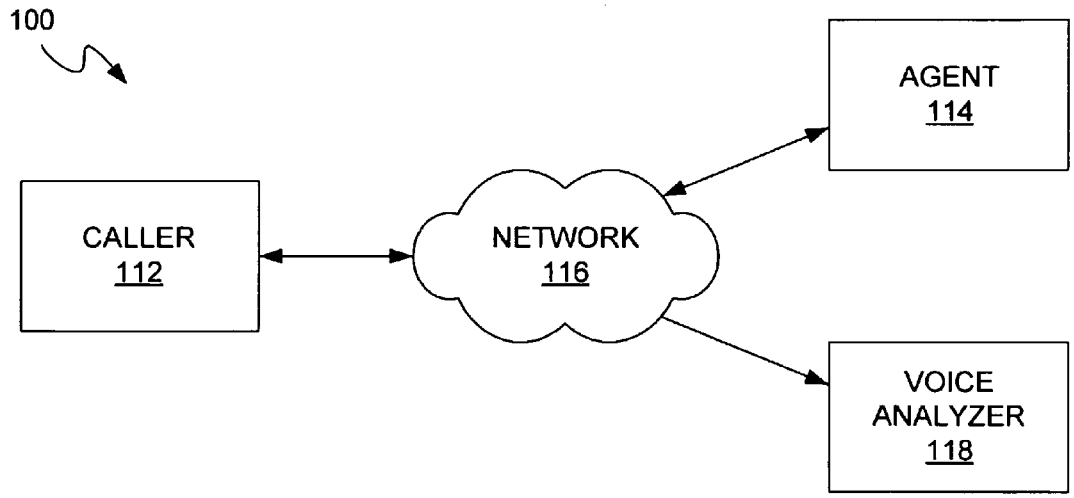
FIG. 1 is a schematic diagram illustrating an embodiment of a system for analyzing audio components of communications.

In this regard, FIG. 1 is a schematic diagram illustrating an embodiment of a system for analyzing audio components of communications. As shown in FIG. 1, system 100 incorporates an audio analyzer 118 that is configured to analyze audio components of communications. In FIG. 1, the audio component is associated with a communication session that is occurring between a caller 112 and an agent 114 via a communication network 116. In this embodiment, the agent is associated with a contact center that comprises numerous agents for interacting with customers, e.g., caller 112.

One should also note that network 116 can include one or more different networks and/or types of networks. As a non-limiting, example, communications network 116 can include a Wide Area Network (WAN), the Internet, and/or a Local Area Network (LAN).

Figure 2:
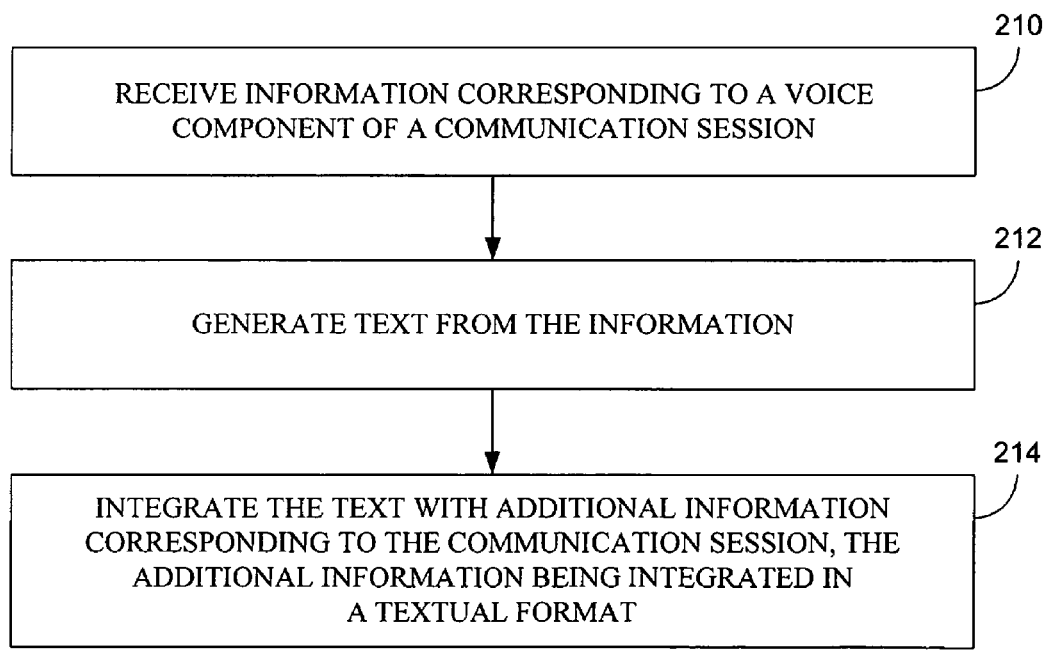
FIG. 2 is a flowchart illustrating functionality (or methods steps) that can be preformed by the embodiment of the system for analyzing audio components of communication of FIG. 1.

In operation, the audio analyzer of FIG. 1 performs various functions (or method steps) as depicted in the flowchart of FIG. 2. As shown in FIG. 2, the functions include receiving information corresponding to an audio component of a communication session (block 210). In block 212, text is generated from the information. Then, in block 214, the text is integrated with additional information corresponding to the communication session, with the additional information being integrated in a textual format. By way of example, in some embodiments, the text with additional information is stored as a text document.

It should be noted that a communication such as a telephone call may last from a few seconds to a few hours and, therefore, may include from one to several thousand words— and several tens of thousands of phonemes (i.e., meaning laden sounds that form spoken words). Thus, in some embodiments, for each word or phoneme, the audio analyzer identifies one or more of the following: the time or offset within the communication at which each word/phoneme started; the time or offset within the communication at which each word/phoneme ended; and the confidence level with which each word/phoneme was identified. In this regard, some embodiments can identify not only the "best guess" word/phoneme but the "N-best" guesses.

Figure 3:
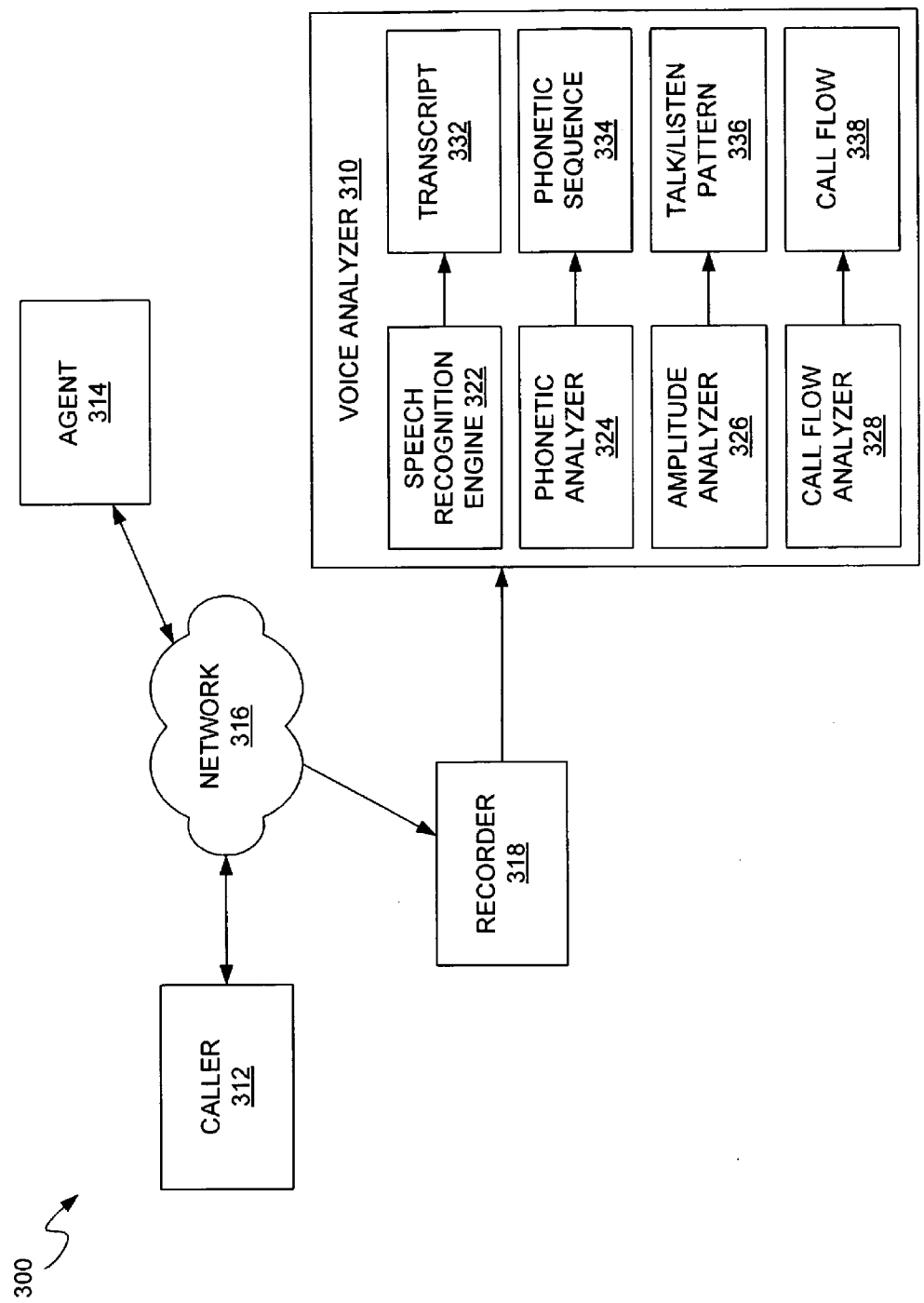
FIG. 3 is a schematic diagram illustrating another embodiment of a system for analyzing audio components of communications.

FIG. 3 is a schematic diagram illustrating another embodiment of a system for analyzing audio components of communications. As shown in FIG. 3, system 300 incorporates an audio analyzer 310 that is configured to analyze audio components of communications. In FIG. 3, the audio component is associated with a communication session that is occurring and/or has occurred between a caller 312 and an agent 314 via a communication network 316. Notably, in this embodiment, at least some of the information corresponding to the communication session is provided to the audio analyzer by a recorder 318 that is used to record at least a portion of the communication session. Thus, when the communication is facilitated by the use of Internet Protocol (IP) packets, the recorder can be an IP recorder. It should also be noted that depending on the type of information that is to be received by an audio analyzer, one or more of various other components may be involved in providing information in addition to or in lieu of a recorder.

As shown in the embodiment of FIG. 3, audio analyzer 310 incorporates a speech recognition engine 322, a phonetic analyzer 324, an amplitude analyzer 326 and a call flow analyzer 328. It should be noted that in other embodiments, an audio analyzer may incorporate fewer than all of the components 322, 324, 326 and 328 and/or all of the corresponding functions.

With respect to the speech recognition engine 322, the speech recognition engine, which can be a large vocabulary type, generates a textual transcript (e.g., transcript 332) of at least a portion of an audio component of a communication session. Once so generated, the transcript can be stored as a text document.

In some embodiments, such a transcript can incorporate interruptions from the other party (e.g., "uh-huh" feedback) within the text of the active speaker. Schemes that can be used for implementing such a feature include but are not limited to: encapsulation within characters that do not form part of the active speaker text (e.g., "<uh-huh>" or "|uh-huh|"); a marker character that indicates the location of the interjection without indicating the actual utterance (e.g., """); the interjection may be inserted within a word or at the next/previous word boundary; and/or the interjection may be surrounded by space or other whitespace (arbitrary) characters so as not to be considered as concatenated to the previous/next word.

The phonetic analyzer 324 generates a phonetic representation of at least a portion of the audio component of the communication session as a text document. This can be accomplished using standard symbols for speech or an alternate mapping of phoneme to character. In some embodiments, a space character can be used to indicate a pause. In a refinement, the duration of pauses may be indicated by multiple space characters, e.g. one space per second.

The amplitude analyzer 326 generates a textual representation of the audio component. In particular, the textual representation includes an identification of which party is speaking at any time during the communication, and an indication of the amplitude of the speech at each time. By way of example, FIG. 4 depicts a textual representation of an audio component of a communication. Specifically, the embodiment of FIG. 4 is a one character per second representation of a call recorded in stereo. This embodiment corresponds to a call in which an agent ("a") greeted the customer for four seconds using normal voice levels (designated by the use of the lower case letter). After a one second pause, indicated by a single space character, the customer ("c") responded at normal levels for three seconds then spoke at a high level (e.g., shouted) for three seconds (designated by the use of the upper case letters). After a four second pause, indicated by the use of four space characters, the agent responded for 13 seconds at normal levels. Then, after a one second pause, indicated by a single space character, the agent spoke for nine seconds, during which the customer interjected twice briefly (designated by the "b" for both speaking at normal levels). After another one second pause, an extended verbal exchange between the agent and customer takes place that is generally broke into a twelve second portion and a ten second portion. Notably, the lack of pauses in this section and the use of capital letters appears to indicate an argument between the customer and the agent.

During the twelve second portion, the customer responded at high levels during which the agent interjected two times (designated by the "B"), first for five seconds and then for three seconds. Then, during the ten second portion, the agent was able to speak for one second at a normal level, after which the customer interjected at high levels for two seconds, following another one second during which the agent was able to speak at a normal level. After that, both the agent and the customer spoke simultaneously for one second, during which at least one of them was speaking at a high level (presumably the customer), and then the customer alone spoke at high levels for five seconds.

An alternative representation, which does not use a fixed number of characters per second of audio, is depicted in FIG. 5. In FIG. 5, the same communication session that was used to generate the text in FIG. 4 has been used for generating this text. In particular, each component in this representation is a combination of a character for who was talking and a number designating the number of seconds of speaking by that person. By way of example, "a4" indicates that the agent was speaking at less than a high level for four seconds.

As in the embodiment of FIG. 4, a lower case letter designates speaking at less than a high level and a capital letter designates speaking at a high level. Note that one benefit of using upper and lowercase letters for designating various features allows for case sensitive searching. Thus, when interested in speech of a high level, case sensitive searching for upper case letters can be used. Whereas, in contrast, if the amplitude level is not relevant to a particular search, case insensitive searching can be performed.

Clearly, various other characters could be used in addition to or instead of those characters used in the embodiments of FIGS. 4 and 5. For instance, the letter "f" could be used to indicate feedback in the audio component.

In a further refinement, more than the three amplitude levels (e.g., silence, normal, high) may be identified with different characters being used to indicate each.

With respect to the call flow analyzer 328, this analyzer generates a textual representation of the communication from a call flow perspective. That is, the call flow analyzer generates text corresponding to the events occurring during the communication, such as time spent ringing, hold times, and talking times. By way of example, FIG. 6 depicts an embodiment of a textual representation of the same communication that was used to generate the text outputs depicted in FIGS. 4 and 5.

As shown in FIG. 6, this representation indicates that the communication involved ringing for 15 seconds ("R15"), talking for 61 seconds ("T61"), on-hold for the following 35 seconds ("H35") and then terminated with caller abandonment ("A"). Clearly, various other characters could be used in addition to or instead of those characters used in the embodiment of FIG. 6 and/or various other events could be represented. For instance, the letter "X" could be used to indicate a transfer and the letter "H" can be used to indicate that an agent hung up the call.

In those embodiments in which an annotation of time is maintained, time approximation techniques such as banding can be used to facilitate easier clustering of the information. For example, it may be desirable to summarize the talk/listen/silence fragments rather than provide a fixed number of characters per second rate. In one implementation of banding, for example, any silence less than 1 second could be represented as "s0," a 1 to 2 second delay as "s1," and a 2 to 5 second delay as "s3," in increasing bands. Notably, the banding for periods of speaking may be different from those of silence and/or hold. For example, hold of 0 to 15 seconds may be considered insignificant and classified as "H0" but when there is speaking, there is a potentially significant difference between many 2 second sentences and a flowing, 10 second sentence. Hence the breadth of the talk bands could be narrower at the low end but broader at the high end. For instance, any continuous period of speaking above 1 minute without letting the customer speak may be considered unacceptable and rare enough that additional banding above 1 minute is not necessary.

Based on the foregoing examples, it should be understood that an embodiment of a voice analyzer can be configured to generate text documents that include various formats of information pertaining to communications. In some embodiments, such a document may include a combination of one or more of the formats of information indicated above to produce a richly annotated record of a communication. This can be achieved in a number of ways. By way of example, such information could be interleaved or can be segmented so that information of like type is grouped together. Notably each such text document can include an attribute that identifies the document type(s), e.g., transcript, phonetic transcript and/or talk/listen pattern.

Additionally or alternatively, at least some of the information can be provided as html tags that are associated with a text document. By way of example, the following html tag could be associated with one or more of the document types described above with respect to FIGS. 4-6, "<telephony state=ringing duration-15/><telephony state=connected><talklisten speaker=agent duration=4.5 volume=normal>Thank you for calling Widgets Inc</talklisten> . . . </telephony>."

Note also the timestamps embedded in the html above. These could be at the talk/listen fragment level, individual word level or every second, on nearest word boundary so as to allow positioning within the call to the nearest second, for example.

In some embodiments, the voice analyzer can determine the time offset within the call of one or more words/phonemes by the insertion of whitespace characters, e.g., tab characters. In such an implementation, a tab can be inserted once each second, for example, between words. This allows the offset of any word, and the duration of any pause to be determined to within 1 second accuracy. This is adequate for retrieving the appropriate section of audio from a call as typically a short lead-in to the specific word/phrase is played to give the user some context within which the word/phrase of interest has meaning. It should be noted that the mechanism for determining any time offset may, in some embodiments, be in addition to any mechanism used for determining segment or event timing.

In some embodiments, the generated text documents are provided to indexing and search algorithms. In some embodiments, the same indexing and search algorithms can be used across the document types because there is little to no overlap between the "tokens" in the different categories of documents. Thus, a search can be constructed using words, phonemes or talc/listen patterns or a combination thereof. The results will be largely unaffected by the presence of tokens from other two domains and a single search across a mixed set of text documents can be performed.

In some embodiments, the text documents are loaded into a text search engine, such as Lucene. Information about Lucene can be located at the World Wide Web address of The Apache Software Foundation, which generates indexes that allow for rapid searching for words, phrases and patterns of text as would be done on web-site content.

In this regard, any such indexing process could be modified so that at least some of the information is excluded from the indexing. By way of example, if a text document is stored as a composite transcript, telephony events and talk/listen pattern, the latter two may be excluded in the same way that embedded html tags are typically excluded from normal text indexing of web documents. In fact, if these subsidiary annotations are embedded as html tags, these tags can be excluded automatically through normal operation by a standard html ingestion parser.

Additionally or alternatively, an ingestion process can be modified so that rather than offset into the text in characters, the offset in seconds of each word is stored. By way of example, the offsets can be deduced from the number of tab characters processed to date if these are used to indicate one second intervals as above.

In some embodiments, a search engine's handling of proximity searches can be modified such that "A within T seconds of B" can optionally mean "by the same speaker" or "by different speakers."

Further, in some embodiments, modified stemming algorithms can be used to stem phonetic strings by stripping the phonetic equivalents of " . . . ing", " . . . ed" etc. rather than the normal English language text stemming algorithm.

Bayesian clustering algorithms can be applied in some embodiments to the text documents to identify phrases of multiple words and/or phonemes that occur frequently. These text documents (and hence the calls/call fragments they represent) can be grouped into clusters that show common characteristics.

A further refinement proactively highlights the emergence of new clusters and the common phrases that are being identified within them. The user may then review some examples of these and determine the significance, or otherwise, of the new clusters.

As a further refinement, a text document generated by a voice analyzer can be incorporated along with call attributes (e.g., ANI, AgentID and Skill). In some of these embodiments, the information can be provided in an xml file. This information can be stored, archived and/or secured alongside the recorded audio or in complementary locations.

As should be noted, the aforementioned exemplary embodiments tend to leverage the highly scalable and efficient text indexing and search engines that the have been developed to search the millions of documents on the web. This can allow businesses to search through the content of millions of calls without impacting their existing relational databases that typically hold the metadata associated with these calls.

Figure 7:
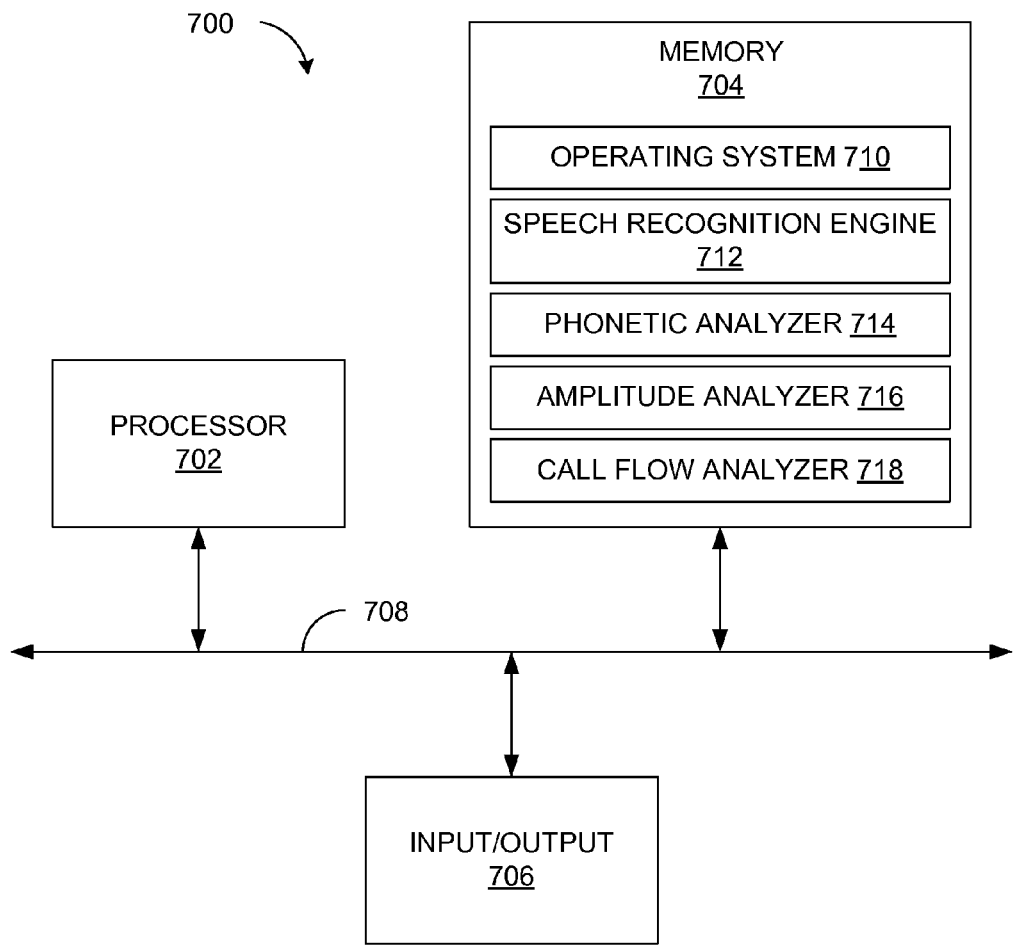
FIG. 7 is a schematic diagram illustrating an embodiment of voice analyzer that is implemented by a computer.

FIG. 7 is a schematic diagram illustrating an embodiment of voice analyzer that is implemented by a computer. Generally, in terms of hardware architecture, voice analyzer 700 includes a processor 702, memory 704, and one or more input and/or output (I/O) devices interface(s) 706 that are communicatively coupled via a local interface 708. The local interface 708 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 710, as well as instructions associated with a speech recognition engine 712, a phonetic analyzer 714, an amplitude analyzer 716 and a call flow analyzer 718. Exemplary embodiments of each of which are described above.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for analyzing audio components of communications comprising:
   receiving information corresponding to an audio component of a communication session at a recorder;
   generating text from the information at a speech recognition engine executing on a computing device; and
   integrating the text with additional information provided by the recorder corresponding to the communication session, the additional information being integrated in a textual format and identifying a party to the communication session with a first representation; and the additional information identifying a characteristic of the audio component associated with the information of the communication session with a second representation,
   wherein the first representation comprises a first letter to indicate audio communication by a first party of the communication session, and wherein the second representation comprises a lower case representation of the letter indicates a first volume level and an upper case representation of the letter indicates a second volume level.

2. The method of claim 1, wherein the additional information comprises amplitude information corresponding to volume levels that the audio component exhibited during the communication session.

3. The method of claim 1, wherein generating text comprises performing speech recognition analysis on the information and generating a transcript of the audio component.

4. The method of claim 1, wherein generating text comprises performing phonetic analysis on the information and generating a phonetic representation of the audio component.

5. The method of claim 1, further comprising indexing at least a portion of the information and the additional information to form text-searchable indexes.

6. The method of claim 5, wherein the indexing is selectively performed such that at least a portion of the additional information is not indexed.

7. The method of claim 6, wherein at least some of the additional information that is not indexed is integrated with the information as an HTML tag.

8. The method of claim 1, further comprising recording the communication session.

9. The method of claim 8, wherein recording comprises capturing screen data associated with the communication session.

10. The method of claim 1, further comprising performing automated evaluation of the communication session.

11. The method of claim 10, wherein performing automated evaluation comprises performing script adherence analysis.

12. The method of claim 1, wherein performing automated evaluation comprises evaluating the communication session for fraud.

13. The method of claim 1, wherein at least a portion of the communication session is conducted using Internet Protocol packets.

14. A system for analyzing audio components of communications comprising:
   an audio analyzer operative to:
      receive information corresponding to an audio component of a communication session from a recorder;
      generate text from the information at a speech recognition engine executing on a computing device; and
      integrate the text with additional information provided by the recorder corresponding to the communication session, the additional information being integrated in a textual format,
   wherein the text with the additional information forms a textual representation of the audio component; and the text with the additional information includes a first representation of a party to the communication session and a second representation of a characteristic of the audio component associated with the information of the communication session,
   wherein the first representation comprises a first letter to indicate audio communication by a first party of the communication session, and wherein the second representation comprises a lower case representation of the letter indicates a first volume level and an upper case representation of the letter indicates a second volume level.

15. The system of claim 14, wherein the audio analyzer comprises a speech recognition engine operative to analyze the information and to generate a transcript of the audio component.

16. The system of claim 14, wherein the audio analyzer comprises a phonetic analyzer operative to analyze the information and generate a phonetic representation of the audio component.

17. The system of claim 14, further comprising an amplitude analyzer operative to provide amplitude information corresponding to volume levels that the audio component exhibited during the communication session, the additional information comprising the amplitude information.

18. The system of claim 14, wherein:
the audio analyzer is further operative to insert timing indicators in the textual representation.

19. The system of claim 14, further comprising a recorder operative to record the audio component such that the information corresponding to the audio component is accessible to the audio analyzer.

20. The system of claim 14, further comprising means for recording the audio component.

* * * * *